A. O'KEEFE.
TOOL HOLDER FOR LATHES, &c.
APPLICATION FILED JUNE 27, 1912.
1,065,712.
Patented June 24, 1913.
2 SHEETS—SHEET 1.
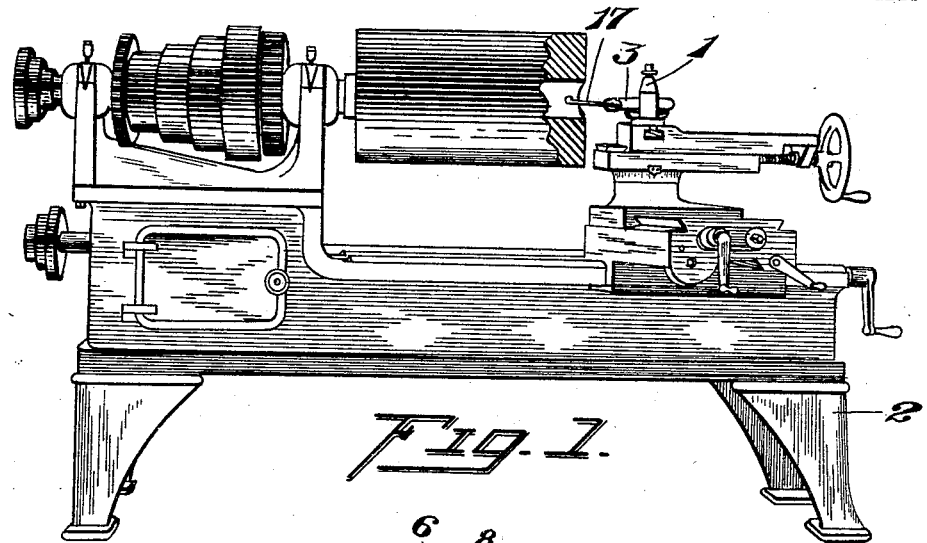
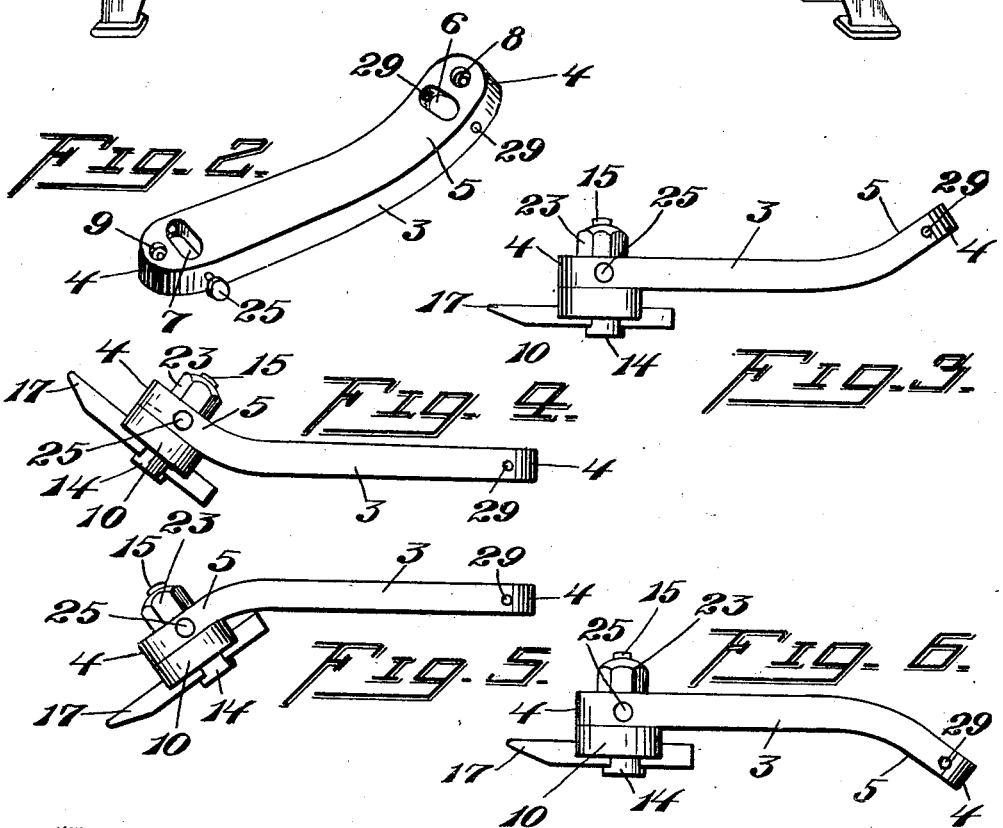
WITNESSES:
Howard R. King.
Frances E. Blodgett.
INVENTOR:
Andrew O'Keefe,
BY
Russell M. Everett,
ATTORNEY.

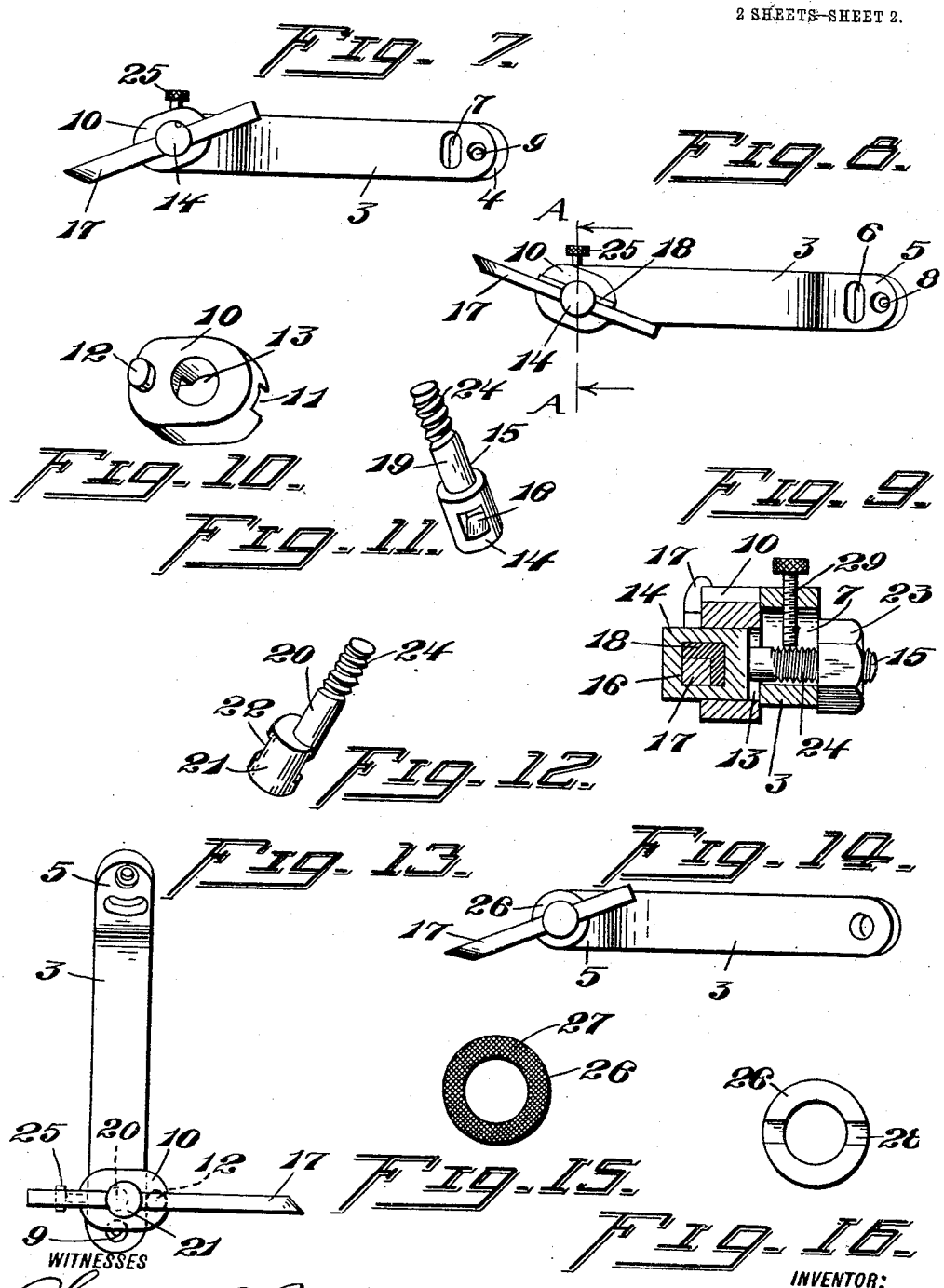

UNITED STATES PATENT OFFICE.

ANDREW O'KEEFE, OF NEWARK, NEW JERSEY.

TOOL-HOLDER FOR LATHES, &c.

1,065,712.  Specification of Letters Patent.  Patented June 24, 1913.

Application filed June 27, 1912. Serial No. 706,163.

*To all whom it may concern:*

Be it known that I, ANDREW O'KEEFE, a citizen of the United States, residing at Newark, in the county of Essex and State of New Jersey, have invented certain Improvements in Tool-Holders for Lathes, &c., of which the following is a specification.

The objects of the invention are to provide a tool holder which can be readily changed from a right hand to a left hand holder or to a straight holder, as is necessary to suit different work and conditions; to enable the angle of the tool to be varied as may be desired in adjusting it to the proper inclination for cutting a given material; to thus enable the same tool and tool holder to be used for different metals or materials requiring different cutting angles, without regrinding the tool; to provide means for positively holding the tool at the desired angle; to enable the tool holder to take tools of various sizes of stock; to secure simplicity and strength of construction, and ease and facility of operation in use, and to obtain other advantages and results as may be brought out in the following description.

Referring to the accompanying drawings, in which like numerals of reference indicate the same parts throughout the several views, Figure 1 is a perspective view of a lathe showing my improved tool holder in use; Fig. 2 is a perspective view of the body of the tool holder with certain parts removed; Figs. 3, 4, 5 and 6, are plan views of the tool-holder in different positions which it may assume, with a tool mounted therein; Figs. 7 and 8 are side views of the tool holder showing the tool adjusted to different angular positions; Fig. 9 is a sectional view taken on line A—A of Fig. 8, looking in the direction indicated by the arrows; Fig. 10 shows in perspective the preferred form of tool carrier; Fig. 11 illustrates one form of clamping bolt which may be employed; Fig. 12 shows the preferred form of clamping bolt; Fig. 13 is a side view of the tool-holder with a tool mounted therein for use in a shaper; Fig. 14 is a side view of the tool holder with a modified form of carrier; Fig. 15 is a bottom view of said modified carrier, and Fig. 16 is a top view of the same.

In said drawings, and particularly Figs. 1 to 11 inclusive, 1, indicates a tool post of the ordinary and well-known form as is commonly employed upon lathes, such as the lathe 2 which I have shown in Fig. 1. It will be understood, however, that said lathe is shown only for purposes of illustration, and that I do not thereby limit the use of my invention; my improved tool holder is equally applicable to other machines, such as shapers, planers, milling machines and any other machines requiring a tool holder.

The tool holder which I have invented comprises a bar 3 preferably of steel rectangular in cross section and having the rounded ends 4, 4. Adjacent to one end of the holder, said bar is bent or curved sidewise, so that the portion 5 is at an angle to the rest of the bar. Also adjacent to each end, the bar 3 is provided with transverse slots 6, 7, each perpendicular to that portion of the bar in which it is located. Between each slot 6 or 7 and the adjacent end of the bar 3, is a pocket or recess 8, or 9, also perpendicular to the portion of the bar in which it is located, and although only one such recess is shown for each slot, it is to be understood that a plurality might be used if desired.

With more particular reference to Figs. 9 and 10, for the moment, I show there a tool carrier 10 preferably formed in side view as elongated or elliptical, with a longitudinal groove or channel 11 in one face and a stud 12 projecting perpendicularly from the other face near one end of the clamp. A hole 13 perpendicular to these opposite faces, and in the line of said groove 11, admits slidably therein the cylindrical head 14 of a clamping bolt 15. Said head 14 has transversely of itself a preferably rectangular aperture 16 of sufficient size to admit the slidable introduction of a tool 17, and which tool also lies in the groove 11, either filling the same itself or with the addition of a filler 18, as shown in Figs. 8 and 9. Said head 14 may be central upon its shank 19, as shown in Fig. 11, or it may be eccentric to the shank, as shown in Fig. 12, where 20 indicates the shank and 21 the head apertured as at 22 to receive a tool. This eccentricity enables the slot 6 to be farther away from the adjacent pocket or recess 8, (or slot 7 from pocket 9), so as to not unduly weaken the bar 3, and yet have the hole 13 in the carrier close to the stud 12 to hold the tool firmly. Whichever form of clamping bolt is used, a nut 23 is adapted to be applied to its threaded end 24, away from the head 14, to secure the desired clamping. In use, the stud 12 of the carrier 10 is inserted in the desired direction in either of the recesses 8 or 9, as is best in that particular instance, and by rotation of the carrier as held by the stud, the hole 13 in the carrier may be brought in coincidence with the slot 6, or 7, as the case may be, in the bar 3. Insertion of the clamping bolt then limits the swing of the carrier, and then the tool 17 is inserted in the aperture of the clamping bolt and in the groove 11 of the carrier. By virtue of the slot 6, or 7, the tool may then be adjusted at any desired angle to the bar 3, at the option and discretion of the operator, two of such possible angles being shown in Figs. 7 and 8. When clamped solidly in place by tightening nut 23 on the clamping bolt, the tool is ready for use, it being understood that said nut draws the clamping bolt hard against the tool in the groove 12 of the carrier and which in turn is drawn against said carrier, the friction between the bar 3 and carrier, together with stud 12, preventing rotation of the carrier in use, and the groove 12 preventing rotation of the tool. However, to be more certain that no rotative movement of the carrier takes place, the tool holder is provided with tapped holes 29 opening into the longitudinal ends of the slots 6 and 7, whereby a thumb-screw 25 may be introduced into the appropriate hole and brought to bear against the clamping screw to prevent the carrier from angular movement when the tool is under strain in use.

Fig. 13 shows my improved tool holder with a tool mounted therein for use in a shaper, the clamping bolt being of the preferred form shown in Fig. 12, and it will be noted that here the stud 12 does not enter the adjacent recess in the bar 3, but lies outside the bar at one edge thereof so as to bear against the same and prevent twisting of the tool-carrier.

In the modified form illustrated by Figs. 14, 15 and 16, the carrier 26 is circular in form and has no eccentric stud as in the preferred construction, frictional contact or engagement between the said carrier and the side of the bar or body of the holder, being sufficient to hold the tool against angular displacement. To this end the contacting face of the carrier 25 is roughened or knurled as at 27, it being understood that the opposite face has the groove or channel 28 for the reception of the tool. The application and operation of this carrier 26 is precisely similar to that of the preferred construction already described, and either form of clamping bolt which I have shown and described may be employed equally well so far as the carrier is concerned. Under some conditions the nurling or roughening of the inner face of the carrier may be omitted and simple friction of the surfaces depended upon, and obviously where roughening or nurling is employed it may be upon the side of the bar 3 instead of upon the carrier, if preferred.

Although the drawings show provision made for a tool constructed from square stock, a tool made from round stock can be inserted and held if desired, even though the hole in the head of the clamping bolt be square and the groove or channel in the carrier correspondingly shaped, or if preferred the said hole and channel groove could be made round to fit a tool of round stock.

Various modifications other than I have shown may be made in the detail construction of my invention without departing from the spirit and scope thereof, and I do not wish to be understood as limiting myself except as expressly stated in the claims and construed in the light of the prior art.

Having thus described the invention, what I claim is—

1. A tool holder comprising a body portion or bar, a tool carrier adapted at one face to lie against the outer surface of either one of the opposite sides of said body portion or bar and at its other face to receive a tool, and a clamping bolt apertured to receive said tool extending through said carrier and bar and binding them together.

2. A tool holder comprising a body portion or bar having opposite flat sides substantially parallel to each other and an aperture of substantially uniform bore opening through said sides, a tool carrier adapted at one face to lie against either one of the opposite sides of said body portion or bar and at its other face to receive a tool, and a clamping bolt apertured to receive said tool extending through said carrier and bar and binding them together.

3. A tool holder comprising a body portion or bar having a transverse slot adjacent its end and a lateral recess between said slot and end, a tool carrier at the side of said body portion or bar having a stud to enter said recess and an aperture adapted to register with said slot, and a clamping bolt extending through said aperture and slot.

4. A tool holder comprising a body portion or bar, a tool carrier adapted at one face to receive a tool and having at its other face an eccentric stud to engage said body portion or bar, and means for clamping said tool carrier against the body portion or bar with its stud in engagement therewith.

5. A tool holder comprising a body portion or bar, a tool carrier slotted at one face to receive a tool and having at its other face an eccentric stud to engage said body portion or bar, and means for simultaneously clamping a tool in said slot and said carrier to the body portion or bar with its stud in engagement therewith.

6. A tool holder comprising a body portion or bar, a tool carrier adapted at one side to receive a tool and having at its other side an eccentric stud to engage said body portion or bar, and a clamping bolt extending through said carrier and bar and adapted to bind them together against angular movement.

7. A tool holder comprising a bar recessed near one end and having a transverse slot adjacent to said recess, a tool carrier having a stud to enter said recess and an aperture adapted to register with said slot, and a clamping bolt adapted to extend through said aperture and slot.

8. A tool holder comprising a bar having a recess near its end and a transverse slot adjacent to said recess, a tool carrier slotted at one side to receive a tool and having in its other side a stud to enter said recess, said carrier being apertured through said slot, and a clamping bolt extending through said carrier and bar and having an aperture adapted to register with said slot of the carrier.

9. A tool holder comprising a bar having a recess near one end and a transverse slot adjacent said recess, a tool carrier at one side of said bar having a stud entering said recess and an aperture registering with said slot, a clamping bolt extending through said aperture and slot, and a stop screw working through one end of said slot longitudinally of the same.

10. A tool holder comprising a body portion or bar recessed near one end and having a transverse slot adjacent to said recess, a tool carrier having a stud to enter said recess and an aperture the center of which is nearer said recess than is the center line of said slot, and a clamping bolt in said slot having an eccentric head in said aperture.

11. A tool holder comprising a body portion or bar, a tool carrier at one side of said bar having in its outer face a slot and being apertured transversely of said slot, a clamping bolt having a head in said aperture with a transverse opening registering with said slot, said aperture and slot providing a tool socket, and means for adjusting said socket to tools of different cross-section without changing the relation of said clamping bolt and tool carrier.

ANDREW O'KEEFE.

Witnesses:
HOWARD P. KING,
FRANCES E. BLODGETT.